United States Patent
Tasik et al.

(10) Patent No.: US 10,416,042 B2
(45) Date of Patent: Sep. 17, 2019

(54) ENGINE EXHAUST EMISSIONS MONITORING DEVICE

(71) Applicant: VOLVO TRUCK CORPORATION, Göteborg (SE)

(72) Inventors: Karl Tasik, Hagerstown, MD (US); Jeffrey Marley, Hagerstown, MD (US); Heath Morris, Hagerstown, MD (US)

(73) Assignee: VOLVO TRUCK CORPORATION, Gothenburg (SE)

(*) Notice: Subject to any disclaimer, the term of this patent is extended or adjusted under 35 U.S.C. 154(b) by 187 days.

(21) Appl. No.: 15/654,807

(22) Filed: Jul. 20, 2017

(65) Prior Publication Data

US 2019/0025158 A1    Jan. 24, 2019

(51) Int. Cl.
| | |
|---|---|
| *G01F 15/10* | (2006.01) |
| *G01M 15/10* | (2006.01) |
| *G01M 13/00* | (2019.01) |
| *G01F 9/00* | (2006.01) |
| *F01N 13/00* | (2010.01) |

(52) U.S. Cl.
CPC .......... *G01M 15/102* (2013.01); *G01M 13/00* (2013.01); *F01N 13/008* (2013.01); *G01F 9/001* (2013.01)

(58) Field of Classification Search
CPC .. G01M 15/10; G01M 15/102; G01M 15/104; G01M 15/106; G01M 15/108; F01N 13/008; G01F 9/001
See application file for complete search history.

(56) References Cited

U.S. PATENT DOCUMENTS

| | | |
|---|---|---|
| 6,148,656 A | 11/2000 | Breton |
| 6,308,130 B1 | 10/2001 | Vojtisek-Lom |
| 6,435,019 B1 | 8/2002 | Vojtisek-Lom |
| 7,568,383 B2 | 8/2009 | Colvin et al. |
| 7,805,986 B2 | 10/2010 | Colvin et al. |
| 7,946,160 B2 | 5/2011 | LaPree et al. |
| 8,626,451 B2 | 1/2014 | Wang et al. |
| 2012/0210697 A1* | 8/2012 | Garimella ............... F01N 3/208 60/274 |
| 2014/0261348 A1 | 9/2014 | Wahl et al. |
| 2015/0143869 A1 | 5/2015 | Booker |
| 2017/0211453 A1* | 7/2017 | Sappok ................ H04B 17/18 |
| 2017/0248494 A1* | 8/2017 | Miller ................... G01N 15/02 |

FOREIGN PATENT DOCUMENTS

| | | |
|---|---|---|
| DE | 202004003643 U1 | 5/2004 |
| EP | 2848912 B1 | 1/2016 |
| WO | 2005085793 A1 | 9/2005 |

\* cited by examiner

*Primary Examiner* — Blake A Tankersley
(74) *Attorney, Agent, or Firm* — Withrow & Terranova, PLLC

(57) ABSTRACT

An exhaust emissions monitoring device includes a pipe adapted to mount to the tailpipe of a vehicle and includes a cable for connecting to the vehicle engine control unit (ECU) and power system. The pipe defines an internal flow passage to allow exhaust to flow through. A plurality of sensors is mounted on the pipe and each sensor extends through an access port formed on the pipe wall to be exposed to the internal flow passage. Exhaust properties and constituents are sensed by multiple sensors for each constituent, there are two or more sensors for each of NOx, temperature, ammonia, particulate matter. The sensors communicate data signals to a processor/data logger also mounted on the pipe.

2 Claims, 3 Drawing Sheets

ENGINE EXHAUST EMISSIONS MONITORING DEVICE

FIELD OF THE INVENTION

The invention is directed to devices for monitoring engine emissions, and more particularly, to a portable device for monitoring engine emissions that can be removably mounted on a vehicle exhaust pipe or tail pipe.

BACKGROUND AND SUMMARY

Engine exhaust testing and monitoring devices are used in exhaust emissions compliance testing and verification. These devices can be stationary, which requires that a vehicle being tested be brought to the testing device and tested while the vehicle is also stationary. Other devices are portable and can be temporarily installed on and carried by a vehicle during testing, which allows the vehicle to be tested under actual use conditions while moving. The Portable Emissions Monitoring Systems (PEMS), which are in use today, tend to be expensive and complex. There is value having a self-contained, portable, and reliable system for exhaust emissions testing.

U.S. Pat. No. 7,805,986 is directed to a portable vehicle exhaust flow sensor. This system measures mass flow and gas temperature, and includes an instrumented pipe 20 that is attached to the vehicle exhaust pipe (FIG. 1) and has a processor to which the sensor cables are connected. The processor case can be mounted to the pipe (See, column 4, lines 44-46). The system lacks specific description of other sensors for measuring additional gas properties or constituents, but discloses generically a gas analyzer that may be connected to the pipe.

U.S. Pat. No. 6,148,656 shows a device having a pipe having a mass flow sensor and temperature sensor that connects to the vehicle exhaust and an electronic unit mounted to the pipe. This system includes a gas analyzer 30 for measuring gas constituents that is carried elsewhere on the vehicle, so it is not self-contained.

The invention provides a simple, low-cost, portable, self-contained unit to evaluate NOx and PM exhaust emission compliance along with other exhaust characteristics.

An exhaust emissions monitoring device according to the invention includes a pipe adapted to mount to the tailpipe of a vehicle. The pipe defines an internal flow passage to allow exhaust to flow through. A plurality of sensors is mounted on the pipe and each sensor extends through an access port in the pipe wall to be exposed to the internal flow passage. Exhaust properties and constituents are sensed by multiple sensors for each constituent, i.e., there are two or more sensors for each of oxides of nitrogen (NOx), temperature, ammonia, particulate matter, etc. The sensors are connected to a controller, which includes a data logger and a microprocessor.

The controller includes a cable for connecting to the vehicle engine control unit (ECU) and power system.

According to one embodiment, the device includes a hollow cylinder carrying sensors exposed to a central passageway, wherein, there are multiple sensors for each of the monitored exhaust constituents (gas temperature, NOx, ammonia, particulate matter), the sensors being connected to a data logger/processor mounted to the cylinder, and a cable to connect the data logger/processor to the vehicle engine control unit (ECU) for receiving vehicle operation data (engine speed, load), for receiving operating power for the processor and sensors, and to communicate with the OBD system to report emissions data.

The use of multiple sensors makes the device able to self-diagnose faults. In addition, multiple sensors make the system output less sensitive to variability of a particular sensor or the failure of a particular sensor.

BRIEF DESCRIPTION OF THE DRAWINGS

The invention will become better understood by reference to the following Detailed Description read in conjunction with the appended drawings, in which.

DETAILED DESCRIPTION

Figure 1:
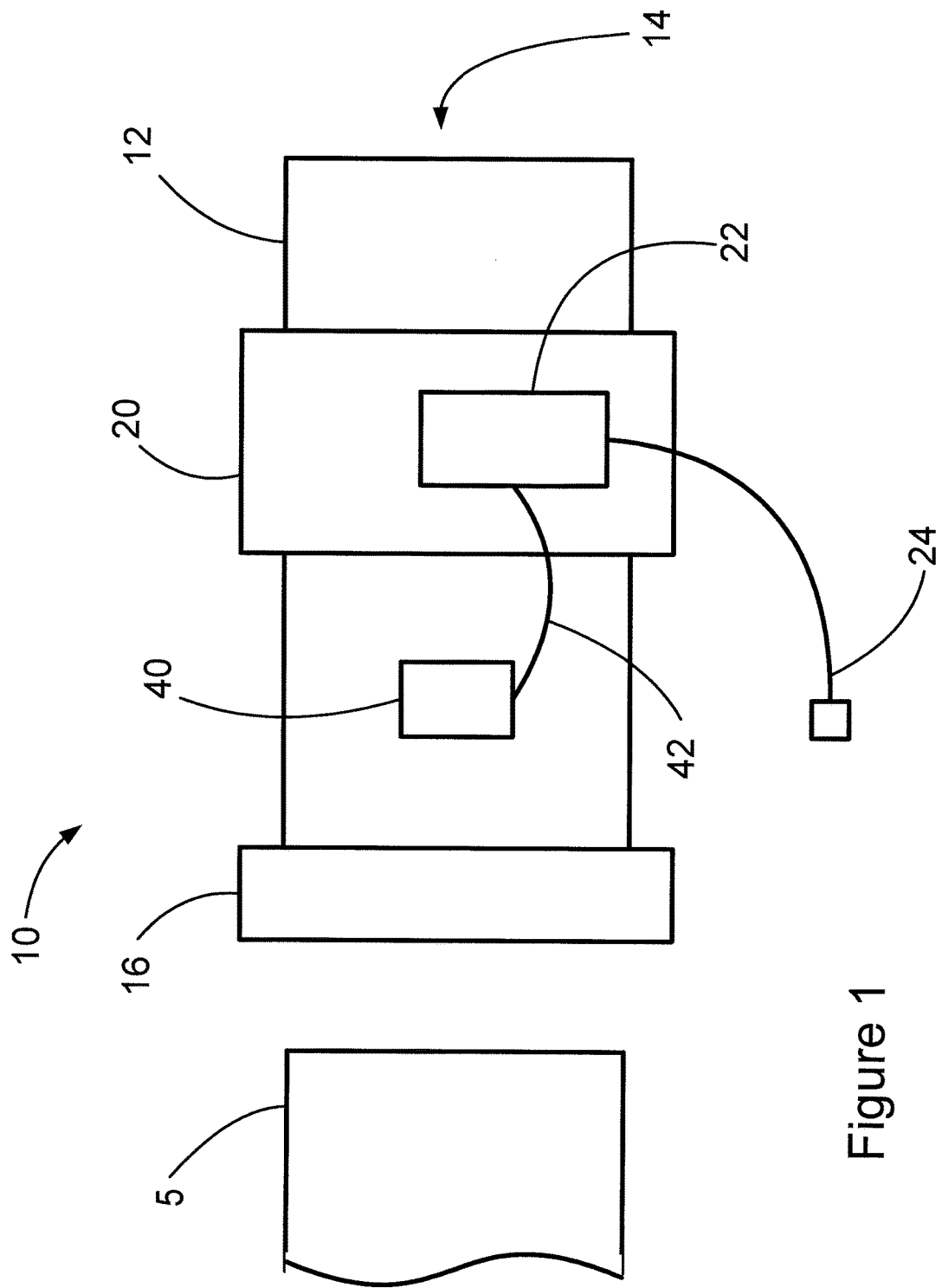
FIG. 1 is a schematic of an exhaust monitoring and testing device according to an embodiment of the invention.

FIG. 1 is a schematic view of an exhaust monitoring device 10 according to an embodiment of the invention. The device 10 is adapted to mount to a vehicle exhaust pipe 5, for example, a tail pipe or stack pipe, which is shown for context, to receive exhaust flow from the pipe 5. The device 10 includes a hollow cylinder or pipe 12 that defines an interior flow passage 14. The pipe 12 may be secured to the vehicle exhaust pipe 5 by a clamp 16 or other suitable mechanism. The device is configured to monitor exhaust gas in the condition the gas is released to the environment and has sensors to measure exhaust gas characteristics (temperature and mass flow, for example) and exhaust gas constituents (NOx, ammonia, CO2, carbon monoxide, uncombusted hydrocarbons, particulate matter, for example). Accordingly, the device would be placed on the vehicle exhaust downstream of any exhaust treatment systems, such as a particulate filter, a selective catalytic reduction system, a lean NOx trap, or other system. The device of the invention may be placed at the outlet of the vehicle exhaust pipe or another convenient location such as at the outlet of the SCR unit (if the SCR unit is the last exhaust treatment device in the gas flow direction) or at an elbow of a stack pipe.

The device 10 includes a sensor ring 20 that houses a plurality of sensors to measure various exhaust gas characteristics and constituents. A control unit 22 is connected to the sensors to receive signals from the sensors. The control unit 22 includes a data logger to store the received sensor signals and processor having software to analyze the sensor signals. The controller 22 may include other devices, such as a gps unit to track location and a transmitter/receiver for wireless communication with a station remote from the vehicle. As illustrated in FIG. 1, the control unit 22 may be mounted to the outside of the sensor ring 20. Alternatively, the control unit 22 may be positioned on the pipe 12 adjacent to the sensor ring 20 or be housed inside the sensor ring 20. A power and communication cable 24 extends from the control unit 22 and is configured to connect to a vehicle engine control unit (ECU; not illustrated) or on-board diagnostic (OBD) unit to carry electrical power to the control unit 22 and allow the control unit to communicate on the vehicle CAN with the engine control unit, the on-board diagnostic (OBD) system, and a vehicle telematics communication unit. The control unit 22 may be configured to receive from the ECU or OBD operating parameters such as engine speed, engine load, ambient temperature, vehicle speed, engine operating mode, or other data. A suitable control unit is the UniCAN 2 Professional data logger available from CSM Products, Inc. of Auburn Hills, Mich.

The sensor ring is 20 is an annular hollow body having a top wall and two side walls that is attached to the pipe 12 and forms an interior space 26 between the sensor ring and the pipe. The sensor ring 20 protects the sensors and other electronics housed in the sensor ring from the exhaust gas environment.

Figure 2:
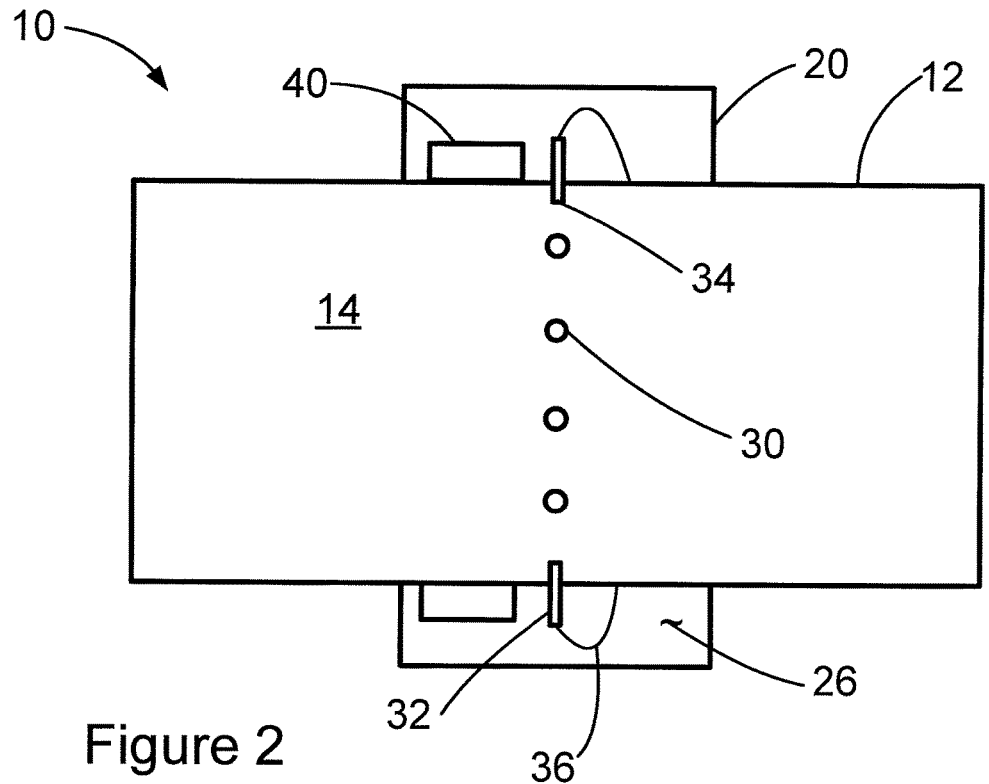
FIG. 2 is a schematic, longitudinal section view of the device of FIG. 1.

Referring now also to FIG. 2, which shows schematically a longitudinal section of the device 10 with the clamp 16 omitted, the pipe 12 includes a plurality of ports 30 formed as circular holes on the pipe wall, conveniently in a circumferential, spaced array. Sensors 32 suitable for the device 10 typically have a body carrying a probe 34 and electrical cable 36 extending from the body, and may include a control unit specific to that sensor.

Figure 3:
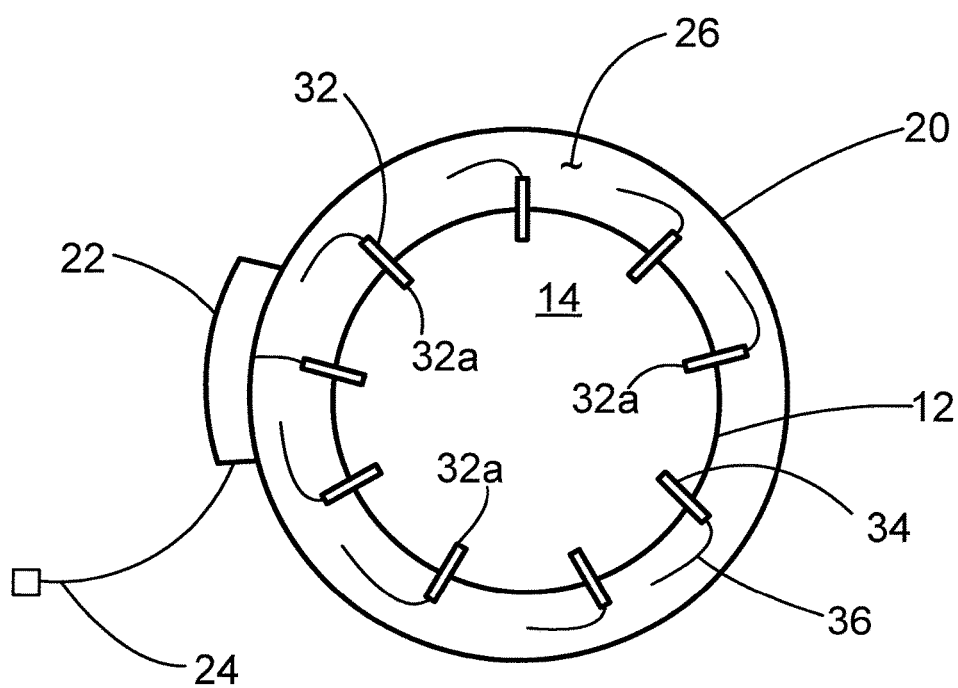
FIG. 3 is an end view of the device of FIG. 1.

As seen in FIG. 2 and FIG. 3, each sensor 32 is positioned and mounted in a port 30 so that the sensor probe 34 is exposed to the interior flow passage 14 of the pipe. The electrical cables 36 of the various sensors are routed in the interior space 24 of the sensor ring 20, along with the sensor control unit, if any, and the sensors are connected to the control unit 22 to receive electrical power from and communicate with the control unit 22. The sensor cables 36 in FIG. 3 are shown truncated and the control units are omitted for clarity of the illustration.

The device 10 may be equipped with sensors for exhaust gas conditions or characteristics such exhaust gas temperature and mass flow, and constituents present in the exhaust gas, such as NOx, ammonia, particulate matter, carbon monoxide, carbon dioxide, and/or other characteristics and constituents as desired. Suitable sensors for the device are commercially-available sensors, and exemplary sensors include the Stoneridge High Temperature Exhaust Gas Temperature Sensors, available from Stoneridge Inc. of Novi, Mich.; Stoneridge Particulate Matter Sensor, available from Stoneridge Inc.; the Smart NOx Sensor available from Continental Automotive of Dearborn, Mich.; and the Delphi Ammonia Sensor available from Delphi Automotive LLP of Troy, Mich.

An advantageous arrangement is to include three sensors for each characteristic or constituent and dispose them spaced about the port array. FIG. 3 shows, for example, three sensors of one type 32a that are mounted on the pipe 12 in an arrangement substantially equally spaced about the circumference of the port array.

The device 10 may include one or more sensors advantageously mounted in a location other than a port 30 as illustrated in FIG. 2 and FIG. 3. For example, the device 10 may include a mass flow sensor having a structure requiring an opening in the pipe 12 different in size or shape from the ports 30. A mass flow sensor 40 may be mounted to the pipe axially adjacent to the circumferential port array shown in FIG. 2 in the interior space 24 of the sensor ring 20. Alternatively, a mass flow sensor 40 may be mounted on the pipe 12, but outside of the sensor ring 20 as illustrated in FIG. 1, and connected to the control unit 22 by an electrical cable 42. The mass flow sensor may be a Hot Film Anemometer type sensor, for example, an HFM Hot-film Mass Air Flow Sensor from Robert Bosch Diesel Systems of Farmington Hills, Mich.

Figure 4:
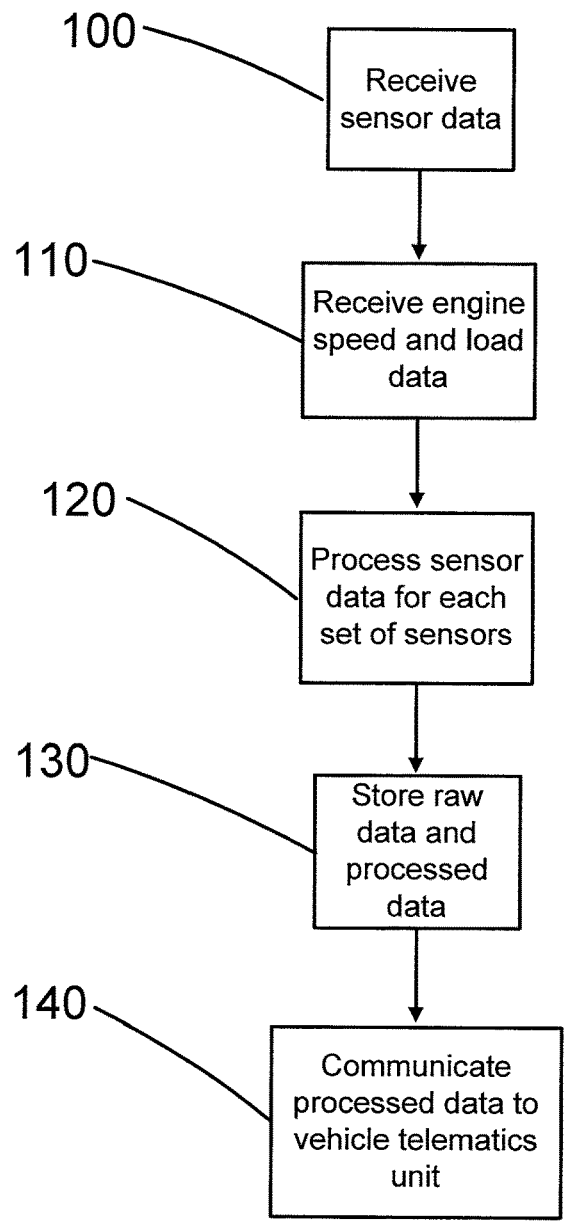
FIG. 4 is a flow diagram illustrating a method for using the device of the invention.

A method for operating an exhaust emissions monitoring device of the invention is illustrated in FIG. 4 and includes the steps of receiving sensor signals from each of set of sensors 100 (each set being the plurality of sensors provided to measure each condition or constituent), receiving engine speed and engine load from the ECU 110, processing the sensor signals from each set of sensors to determine a current measurement for each condition and constituent 120, storing the sensor signals and processed data in the data logger 130, and communicating the processed data to the vehicle telematics system 140, for transmission off the vehicle.

The sensor signals may be processed by averaging the signals for each type of sensor and organizing the averaged signal values in chart format according to sensor type and time of collection.

Alternatively, the signals may be processed according to the operating conditions of the vehicle or engine. The device 10 can communicate by way of the cable 24 or the wireless transmitter/receiver with the engine ECU and/or the vehicle OBD system to receive operating parameters such as engine speed, engine load, ambient temperature, vehicle speed, engine operating mode, or other data. The sensor data may be processed, for example, according to a Work Base Window application, such as currently used in European countries, to present sensor data according to units of work performed by the engine, for example, NOx output per unit of Kilowatt-hour.

Alternatively, the sensor data may be correlated to other operating conditions, such as vehicle speed ranges. For example, NOx concentration in the exhaust can be reported for the time the vehicle is at idle, operated at 1 to 15 miles per hour, operated 16-25 miles per hour, etc., for a selected operating period. In addition, NOx, or another sensor output, can be correlated to other operating conditions, such as engine power output as a percentage of maximum power output (less than 25%, 26% to 50%, above 50%). These data can be reported separately or in a combined format, for example, NOx at each engine power output segment at a particular vehicle speed range.

The use of at least two sensors of each type makes the device capable of self-diagnosis. A diagnostic routine may include the control unit receiving the raw sensor data and comparing the signals for the sensors of each type with each other and/or with historical data for that type of sensor saved in memory. If the value of the sensor signal from any sensor differs by more than a predetermined percentage from the value of the sensor signals of the other sensors or the saved sensor data for the same operating conditions, the controller will flag a fault. The signals from that faulty sensor will be discarded and the fault reported over the vehicle OBD system or the device's wireless transmitter to an off-board station.

The device is a system of sensors with a controlling processor. The device receives power and CAN-communicated information, such as engine speed and load, from the engine ECU. This power and CAN information is currently available on all vehicles today. The device will utilize its own emissions sensing sensors in conjunction with the CAN information to calculate real time emissions while the vehicle is on and operating. The control unit 22 processor will make these emissions calculations and store all of the past information independent of the engine/vehicle it is installed on. The processor will make its data available as a CAN output over the same public CAN network upon request. Some set of information is available at 1 hz and others only upon request. The unit will calculate both real time values as the vehicle operates and maintain a log of emissions history on the vehicle.

The processor will also contain algorithms and diagnose any of its own failures. This will be done using a combination of models and multiple sensor comparisons. It will be designed to be completely independent of the engine generating the emissions. Any faults will be broadcasted over the same diagnostic CAN just like the engine ECU uses. The device may also be outfitted with a cellular connection where which it can submit reports on the vehicle based on the logged emission history just as they are available over the CAN network.

Two advantageous uses for this device are contemplated. The first is as a less expensive alternative to current devices for compliance testing and verification. Vehicle manufacturers may recognize value in having a self-contained reliable system for internal testing.

The second use is for possible emission regulation. The device of the invention could be installed on all engines manufactured in the US to operate independent of the vehicle systems to report vehicle compliance to authorities. This would allow vehicles equipped with the device to be audited by a third party supplier and the US government.

The invention has been described in terms of preferred embodiments, components, and methods, but those skilled in the art will understand that the invention as defined by the appended claims may be practiced with alternative embodiments and equivalent components and method steps.

What is claimed is:

1. A device, comprising:
    a cylinder having a wall defining an interior passageway and a plurality of access ports formed on the wall;
    a sensor ring mounted to the cylinder;
    a plurality of sensors to monitor exhaust characteristics and constituents housed by the sensor ring and carried by the cylinder and extending through the access ports on the cylinder wall to be exposed to the interior passageway, wherein, at least two sensors are provided for each of the monitored exhaust characteristics and constituents;
    a processor configured to log data received from the sensors mounted on the cylinder and connected to the sensors to receive signals from the sensors; and
    a cable connected to the processor and adapted to connect to a vehicle ECU for receiving vehicle operation data and operating power, and to communicate with an OBD system to report exhaust characteristics status.

2. The device as claimed in claim 1, wherein the monitored exhaust characteristics include mass flow and temperature and the monitored constituents include NOx, ammonia, and particulate matter.

* * * * *